United States Patent Office 3,298,934
Patented Jan. 17, 1967

3,298,934
METHOD OF ANALYSIS TO DETERMINE THE RATIO BETWEEN BIVALENT AND MONOVALENT COPPER IONS IN A CUPROUS AMMONIACAL SOLUTION
Pietro Angeleri, Milan, Italy, assignor to Montecatini Edison S.p.A., Milan, Italy
Filed Apr. 8, 1963, Ser. No. 271,172
Claims priority, application Italy, Apr. 10, 1962, 7,124/62
1 Claim. (Cl. 204—1)

In chemical processes requiring absorption of carbon monoxide from gaseous mixtures, it is common practice to scrub the gas with a cuprous ammoniacal or copper-ammonia solution having the property of trapping carbon monoxide. An important example is in ammonia synthesis plants utilizing hydrogen having traces of carbon monoxide, such gases being obtained by cracking hydrocarbons. CO must be eliminated to avoid poisoning the catalyst. The solution used for CO absorption must be previously prepared in a manner to ensure that the $Cu^{++}/Cu^+$ ratio, between its bivalent and monovalent ions, has a determined value of approximately 0.20.

When operating continuously, the solution must be constantly regenerated, so as to keep the value of the above-mentioned ratio constant. Consequently, periodic analysis of the solution is required.

At present a chemical method of analysis is universally employed, based on a color change of an appropriate reagent. However, this method requires time and is discontinuous. Thus, even when the analysis is carried out periodically, at great expense, timely correction of the ratio under control is not obtained.

The present invention has as an object to overcome the above inconveniences by a method of physical analysis.

The method of the invention, which completely replaces chemical methods and their attendent difficulties, more particularly allows for not only the measurement of the ionic ratio concerned but also the continuous recordation of the measured value and even the self-adjustment of such value when necessary.

Figure 1:
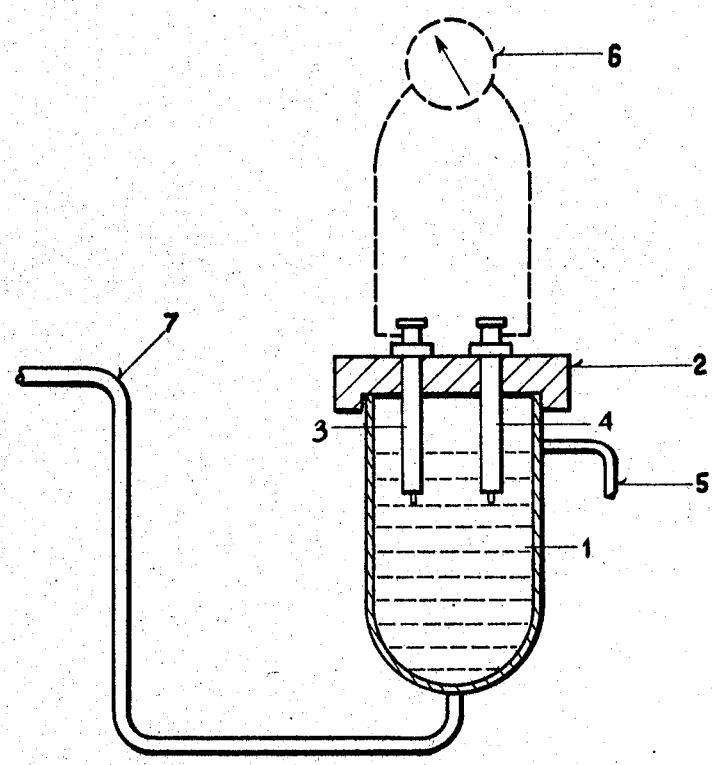

In the drawings:
FIG. 1 shows a schematic illustration of apparatus used according to the invention, and
FIG. 2 discloses a graph of the results achieved by the apparatus of FIG. 1.

Considering the drawings in further detail, in FIG. 1 numeral 1 represents a glass measuring cell wherein the cuprous ammoniacal solution (copper-ammonia salt solution, copper-ammonia salt liquor) to be analyzed is continuously flowing. The cell has a cover 2 made of insulating material, such as polyvinyl chloride. Measuring electrode 3 consists of a copper rod having a diameter of about 2 mm. and with the exception of both ends (tips) is covered with a plastic insulation, such as polyvinyl chloride. One end (tip) of the copper rod is immersed about 5 mm. into the liquid to be tested, in this case copper-ammonia salt solution, and the other end (tip) of the copper rod is fastened to a terminal above the cover, which terminal in turn is connected to the measuring instrument 6. A comparison electrode 4 which consists of a gold wire or plate projects about 5 mm. from an insulating glass sleeve, whose surface is contacting at least 10 sq. mm. of the liquid to be tested. The upper portion of the gold wire is connected to a terminal above the cover 2 which in turn is also connected to measuring instrument 6. The cuprammonia solution to be tested is introduced into cell 1 through sampling plug 7 and overflows from the measuring cell by means of overflow line 5 whence it goes to a recovery tank not shown.

The measuring and recording instrument 6 is, per se, not part of the instant invention. This measuring device is a sensitive millivoltmeter with electronic amplification and very high input impedance, and can be commercially obtained by manufacturers specializing in electronic instruments. The measuring instrument can be interconnected with control mechanisms for maintaining the desired predetermined $Cu^{++}/Cu^+$ ratio.

Figure 2:
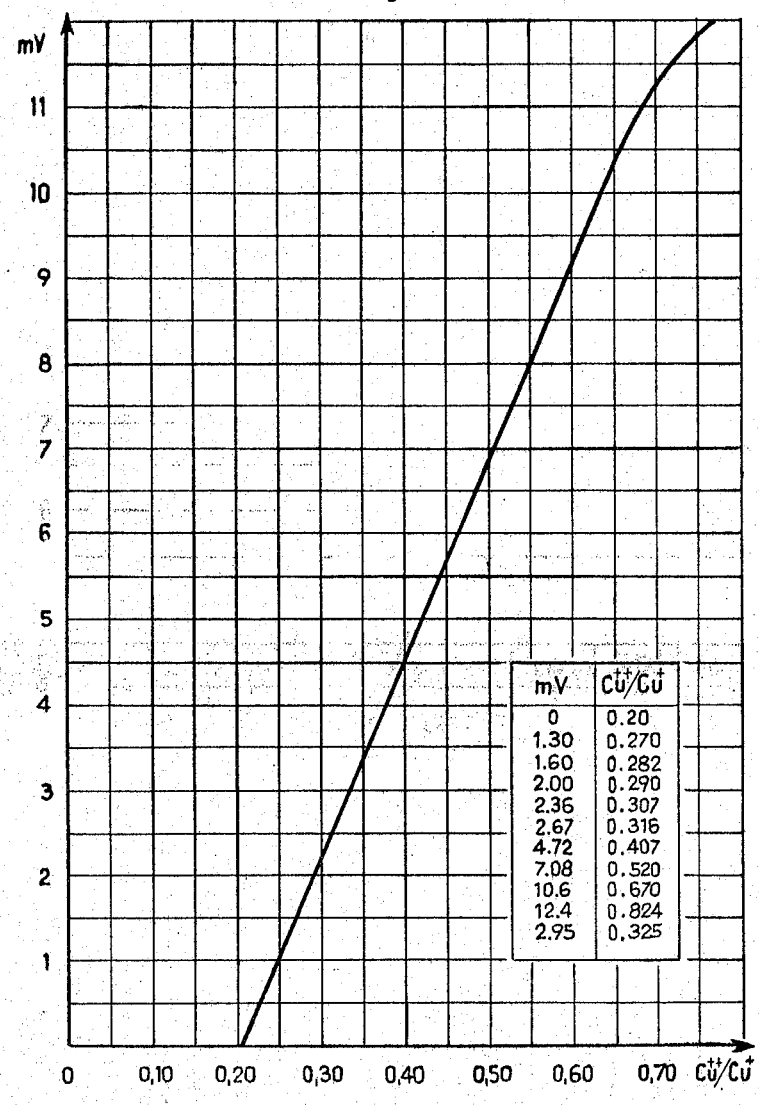

The difference of potential between the two terminals detected by the millivoltmeter and recorded by a normal electric recorder, is a continuous logarithmic function of the value $Cu^{++}/Cu^+$, which in the region of the ratios of interest is close to linear, as is shown in FIG. 2 of the drawing.

The difference of potential to be detected between the measuring electrode and the comparison electrode could possibly be effected by variations of ammonia concentration and formic acid concentration, which accidentally could occur. Many electrodes such as the classic comparison electrode, i.e. the calomel, or mercurous chloride electrode, are not suited for this purpose, in that fluctuations of these other extraneous materials effect changes in the characteristic of the comparison electrode.

The electrode couple of the present invention has a substantially linear variation (namely a variation sufficiently close to linear for the purposes aimed at) of the differential of potential measured between the two electrodes with variation of ionic ratio $Cu^{++}/Cu^+$ which is independent of the changes in concentration of ammonia or formic acid, which are present in the solution to be analyzed. The measured potential is independent of ammonia concentration variation of less than 1%, which is amply sufficient for the purposes of the invention. Furthermore, the electrode characteristic does not become poisoned, even in a reducing medium as would occur with a platinum electrode.

I claim:
A method for determining the ratio of cupric to cuprous ions in a copper-ammonia salt solution containing both ions, which comprises inserting a copper measuring electrode and a gold comparison electrode into the said solution, and measuring the potential difference between the two electrodes by suitable measuring devices.

References Cited by the Examiner
UNITED STATES PATENTS

| | | | |
|---|---|---|---|
| 2,805,191 | 9/1957 | Hersch | 204—1 |
| 2,838,233 | 6/1958 | Garrison | 204—1 |
| 2,943,028 | 6/1960 | Thayer et al. | 204—195 |
| 3,043,764 | 7/1962 | Harvey | 204—195 |

JOHN H. MACK, Primary Examiner.
T. TUNG, Assistant Examiner.